United States Patent
Kram et al.

(10) Patent No.: US 7,865,649 B2
(45) Date of Patent: Jan. 4, 2011

(54) MODULE FOR REPRODUCING A TRANSMITTER SIGNAL

(75) Inventors: Raimund Kram, Erlangen (DE); Jochen Schlinkert, Höchstadt/Aisch (DE); Richard Schneider, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 716 days.

(21) Appl. No.: 11/722,126

(22) PCT Filed: Dec. 6, 2005

(86) PCT No.: PCT/EP2005/056528
§ 371 (c)(1),
(2), (4) Date: Jun. 19, 2007

(87) PCT Pub. No.: WO2006/067035
PCT Pub. Date: Jun. 29, 2006

(65) Prior Publication Data
US 2009/0094396 A1    Apr. 9, 2009

(30) Foreign Application Priority Data
Dec. 21, 2004    (DE) .................. 10 2004 061 579

(51) Int. Cl.
*G06F 13/00* (2006.01)
(52) U.S. Cl. .......................... 710/305; 700/30; 703/7; 710/100
(58) Field of Classification Search .................. 710/100, 710/305; 700/1, 28–30, 114, 170, 173, 274; 703/7
See application file for complete search history.

(56) References Cited

U.S. PATENT DOCUMENTS

| 5,798,919 A * | 8/1998 | Suita et al. ..................... 700/30 |
| 7,228,374 B2 * | 6/2007 | Hammer et al. ............. 710/315 |
| 2009/0198366 A1 * | 8/2009 | Schneider ................... 700/110 |
| 2009/0299509 A1 * | 12/2009 | Diezel et al. .................. 700/97 |

FOREIGN PATENT DOCUMENTS

| DE | 197 03 090 A1 | 10/1997 |
| DE | 101 13 261 A1 | 9/2002 |
| DE | 101 25 608 A1 | 12/2002 |
| DE | 103 08 654 A1 | 9/2004 |
| EP | 0 375 487 A1 | 6/1990 |
| EP | 1 134 638 A2 | 9/2001 |
| JP | 08-087316 A | 4/1996 |
| JP | 2004-082243 A | 3/2004 |

* cited by examiner

*Primary Examiner*—Glenn A Auve
(74) *Attorney, Agent, or Firm*—Henry M. Feiereisen; Ursula B. Day

(57) ABSTRACT

The invention relates to a module for reproducing a transmitter signal ($x_{actE}$). A control device (1) is coupled to a driving device (4a) for controlling a machine while being coupled to the module (5, 5') via a data bus (7) for exchanging data. A reproduced transmitter signal ($x_{actEn}$) is determined from a reference value ($x_{des}$) that is predefined by the control device with the aid of the module (5, 5'). The module (5, 5') is logically coupled to the control device (1) via the data bus (7) in such a way that the module (5, 5') is projected in the same way as the driving device (4a) from the perspective of the control device (1). The inventive module (5, 5') for reproducing a transmitter signal ($x_{actE}$) thus makes it possible to project, start, and adjust the dynamics of the machine in a simple manner.

7 Claims, 2 Drawing Sheets

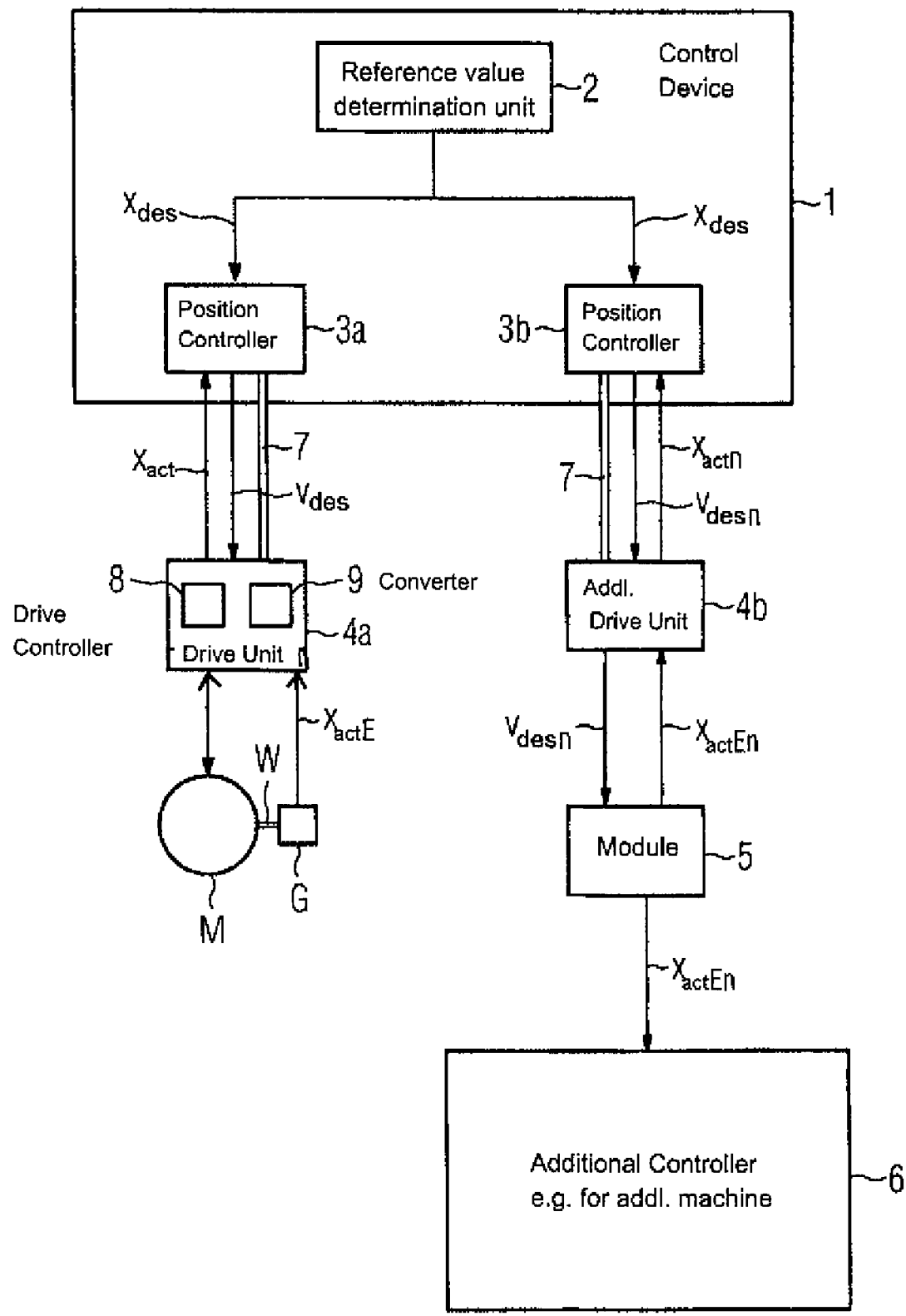

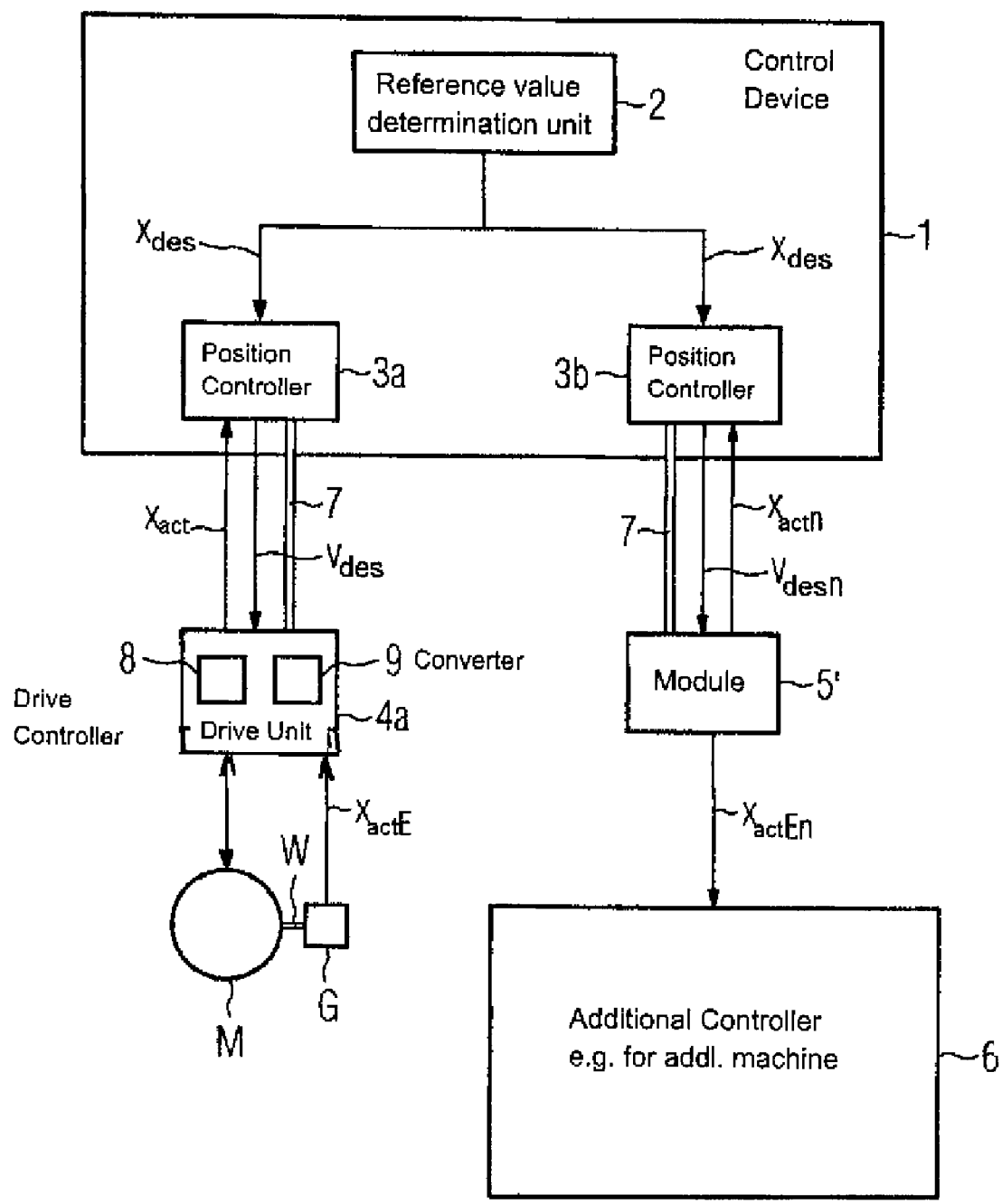

MODULE FOR REPRODUCING A TRANSMITTER SIGNAL

BACKGROUND OF THE INVENTION

The invention relates to a module for reproducing a transmitter signal.

In machines, for example robots, production machines (for example printing machines/packaging machines), and/or in machine tools, it is often necessary to forward a guide value, which is calculated in a control device of the machine and may be, for example, in the form of a desired position value for a driven machine axle of the machine, to a further control device of the same machine or another machine in the form of a reproduced transmitter signal. In this case, the guide value signal is converted into a transmitter signal in such a manner that the guide value is forwarded as a transmitter signal to the further control device in the form of an incremental signal of an incremental track.

Such forwarding of a guide value from one control device to another using a reproduced transmitter signal for the purpose of controlling a machine axle is conventionally returned if, for example, the two control devices do not have a common bus system because they were manufactured by different manufacturers, for example, or because the other control device cannot be informed of the guide value in a simple manner for other reasons (for example no suitable bus protocol, no available free communication interfaces, no isochronous bus). In this case, the value which is output by reproducing the transmitter signal should correspond as precisely as possible to the value obtained in the control device for a real machine axle.

In this case, the transmitter signal is conventionally reproduced from the guide value signal using an external module for reproducing the transmitter signal. In this case, the module is conventionally connected to the control device using a data bus, for example.

In this case, the module uses its own specific function to ensure that the desired requirements in terms of the dynamics and output accuracy of the reproduced transmitter signal meet the requirements desired by the user. In this case, the user must conventionally design the functions of the module separately from the control device and the drive devices of the machine using a dedicated module-specific interface, for example. The functionalities of the control device and of the drive devices of the machine have therefore had to be designed separately to date. This means that, from a technological point of view, the control device, the drive devices and the module are not designed in a standard manner in conventional modules, which makes start-up and parameterization of the machine considerably more difficult and involves considerable additional outlay.

The German laid-open specification DE 10308654 A1 discloses a data transmission system for connecting a controller to drives.

SUMMARY OF THE INVENTION

The invention is based on the object of forming a module for reproducing a transmitter signal in such a manner that it is possible to start up the machine in a simple manner.

This object is achieved by means of a module for reproducing a transmitter signal, a control device for controlling a machine being coupled to a drive device and to the module by means of a data bus for interchanging data, the module being used to determine a reproduced transmitter signal from a guide value predefined by the control device, the module being logically coupled to the control device by means of the data bus in such a manner that, from the point of view of the control device, the module is designed in the same way as the drive device.

In this case, it proves to be advantageous if the module is directly coupled to the control device by means of the data bus.

It is then possible to dispense with the use of a further drive device as a connecting element between the data bus and the module.

It also proves to be advantageous if the module is coupled to the control device via a further drive device by means of the data bus. If the bus connection of the module is effected using a further drive device, the module can have simpler hardware.

Furthermore, it proves to be advantageous if, from the point of view of the control device, the module is designed in the same way as the drive device, the module being logically coupled as an actuator. If the module is logically coupled as an actuator, the functions of the module can be designed like an actuator of a drive device.

It also proves to be advantageous if the transmitter signal is reproduced from the guide value by reproducing the control and/or regulating behavior of a machine axle. This ensures particularly accurate reproduction of the transmitter signal.

It also proves to be advantageous if the data bus is in the form of a Profibus, standard bus protocols, for example PROFIdrive or Profile Drive Technology Version 3.1.1, being able to be used.

Furthermore, it proves to be advantageous if, from the point of view of the control device, the reproduced transmitter signal is regulated and has its dynamics set in the same way as a machine axle that is controlled by the control device. This makes it possible to regulate and set the dynamics of the reproduced transmitter signal in a simple manner.

The module according to the invention can be used in a particularly effective manner in a machine tool, a production machine and/or a robot.

BRIEF DESCRIPTION OF THE DRAWING

Two exemplary embodiments of the invention are illustrated in the drawing and are explained in more detail below. In the drawing:

FIG. 1 shows a first embodiment of the invention, a module being coupled to the control device indirectly, that is to say via a further drive device, by means of the data bus.

FIG. 2 shows a second design of the invention, the module being directly coupled to a control device by means of a data bus.

DETAILED DESCRIPTION OF PREFERRED EMBODIMENTS

FIG. 1 illustrates a block diagram of a first exemplary embodiment of the invention. In this case, a control device 1 for controlling a machine contains a guide value determination unit 2 in addition to other components which, since they are not important to understanding the invention, are not illustrated. In this case, in order to control the individual machine axles of the machine, said guide value determination unit determines a respective associated guide value for each machine axle, the guide value being in the form of a desired position value $x_{des}$ for controlling a position of a shaft W in the exemplary embodiment. Inside the control device 1, the desired position value $x_{des}$ is supplied as an input variable to a position regulating device 3a which regulates the position (angle of rotation) of the shaft W. The control device 1 is coupled, by means of a data bus 7, to a drive device 4a that has, inter alia, a converter 9 and a regulating device 8 for driving a motor M. The position regulating device 3a predefines, as an output signal for the regulating device 8 of the drive device 4a, a desired speed value $v_{des}$ for regulating the speed of the shaft W. The regulating device 8 uses the converter 9 to drive the motor M.

In order to supply the motor with electrical energy, the drive device 4a is connected to the motor M using corresponding lines which are not illustrated, however, for the sake of clarity. Furthermore, for the purpose of interchanging data, the drive device 4a is also coupled to the motor M by means of a connection which is in the form of an Ethernet connection in the exemplary embodiment. The Ethernet connection can be used, for example, to transmit motor data from the motor M to the control device 1. For example, the motor M can thus inform the control device 1 of its type, its power and/or its maximum torque. The control device 1 can then accordingly parameterize the individual regulators on the basis of this data. In this case, the motor M is also referred to as an actuator. In this case, different actuators can be connected to the drive device 4a, in which case said actuators do not necessarily have to be in the form of a motor but may also be, for example, a hydraulic or another electrical component. In the exemplary embodiment, the motor M drives the shaft W. The position of the shaft W is detected by a transmitter G and is supplied to the drive device 4a as a transmitter signal in the form of an actual position value $x_{actE}$ using, for example, a further Ethernet connection which couples the transmitter G to the drive device 4a. In this case, the actual position value $x_{actE}$ is in the form of a typical transmitter signal, that is to say an incremental signal, for example, which is obtained as a typical output signal from a transmitter by sampling increments of a track of the transmitter. The (incremental) actual position value $x_{actE}$ is converted inside the drive device 4a into a corresponding actual position value $x_{act}$, which directly contains the position of the shaft W as information in the form of a digital value, for example, and is forwarded to the position regulating device 3a as an actual variable. The drive device 4a also calculates an actual speed value for regulating the motor M by differentiating the actual position value.

Together with the shaft W, for example, which may be in the form of a printing roll in a printing machine, for example, the motor M forms a so-called machine axle. In this case, the machine generally has a plurality of machine axles, each machine axle generally being assigned a position regulating device 3a, a drive device 4a and an associated motor M. That is to say there are generally several position regulating devices 3a, drive devices 4a and motors M, inter alia. In this case, the guide value determination unit 2 calculates a correspondingly associated guide value in the form of a guide value signal for each machine axle. Only one machine with an individual machine axle is illustrated in the exemplary embodiment for the sake of clarity.

In this case, the control device 1 is in the form of a bus master with respect to the data bus 7, while the drive device 4a is in the form of a slave. Since the drive device 4a, the motor M and the transmitter G are logically coupled to the control device 1 in a standard manner by means of the data bus 7, these components can be continuously designed from the control device 1 from the point of view of the user. In the case of multi-axle machines in particular, the individual drive devices and actuators can thus be designed in a standard manner.

According to the invention, a reproduced transmitter signal $x_{actEn}$ which corresponds to the real transmitter signal $x_{actE}$ is then intended to be reproduced from the guide value $x_{des}$ using a module 5 for reproducing the transmitter signal $x_{actE}$ and to be output to a further controller 6, for example. In this case, the module 5 is logically coupled to the control device 1 by means of the data bus 7 in such a manner that the module 5 is designed in the same way as the drive device 4a from the control device 1, the module being logically coupled as an actuator. In order to reproduce the real transmitter signal $x_{actE}$, the guide value $x_{des}$ is passed as an input variable to a further position regulating device 3b. In this case, the position regulating device 3b is preferably designed in an identical manner to the position regulating device 3a. The position regulating device 3b generates a reproduced desired speed value $v_{desn}$ which is forwarded to a further drive device 4b. Like the drive device 4a, the drive device 4b is coupled to the control device 1 by means of the data bus 7 for the purpose of interchanging data. In this case, the further drive device 4b is essentially used only to couple the module 5 for reproducing the transmitter signal to the control device 1 by means of the data bus 7. In this case, the further drive device 4b operates again as a slave on the data bus. In the exemplary embodiment, the module 5 is again coupled to the further drive device 4b using an Ethernet connection, for example. According to the invention, the module 5 is logically coupled to the further drive device 4b and thus to the control device 1 as an actuator. The module 5 is thus coupled to the further drive device 4b in the same logic manner in which the motor M is coupled to the drive device 4a. This makes it possible, from the point of view of the control device 1, to design the module 5 in the same way as the drive device 4a. From the point of view of the control device, that is to say from the point of view of the user, the module 5 for reproducing the transmitter signal acts only as a further actuator for the design process.

The reproduced desired speed value $v_{desn}$ which is generated by the further position regulating device 3b is read in by the further drive device 4b and forwarded to the module 5. In the module 5, the reproduced desired speed value $v_{desn}$ is then used to determine a reproduced transmitter signal $x_{actEn}$ by virtue of the module 5 reproducing the real transmitter signal $x_{actE}$ of the transmitter G using functions such as symmetry filters, time delay elements and, for example, adaptation of the regulating device 8a as well as reproduction of the behavior of the motor M and of the shaft W. As the output signal, the module 5 outputs a reproduced transmitter signal $x_{actEn}$, for example in the form of an incremental signal, as the reproduced transmitter signal. Ideally, the reproduced transmitter signal $x_{actEn}$ is identical to the real transmitter signal $x_{actE}$ in this case. The reproduced transmitter signal $x_{actEn}$ is in turn read in by the further drive device 4b and is used to determine the reproduced actual position value $x_{actn}$ which directly contains the position of the shaft W as information in the form of a digital value, for example. The reproduced actual position value $x_{actn}$ is forwarded to the control device 1, in particular to the further position regulator 3b, by means of the data bus 7.

Furthermore, the reproduced transmitter signal $x_{actEn}$ is output to the outside and is forwarded to a further control device 6 in the exemplary embodiment. In this case, the control device 6 may be used to control a further machine, for example.

In this case, the further drive device 4b is preferably identical to the drive device 4a but a converter 9 is expediently not fitted in the further drive device 4b since it is not required.

As a result of the fact that, for example, the transmitter signal $x_{actE}$ is reproduced from the guide value $x_{act}$ by reproducing the control and/or regulating behavior of the machine axle, there is a high degree of correspondence (for example as regards dynamics, time delay, measured value accuracy) between the reproduced transmitter signal $x_{actEn}$ and the real transmitter signal $x_{actE}$. The module 5 is, in principle, coupled to the control device 1 like a further machine axle. From the point of view of the user, there are thus no longer any differences between designing a real machine axle and designing the quasi virtual machine axle with the module 5. The basic design of the further embodiment of the invention, which is illustrated in FIG. 2, essentially corresponds to the above embodiment described in FIG. 1. Therefore, the same elements in FIG. 2 are provided with the same reference symbols as in FIG. 1. The only fundamental difference is that, in the embodiment shown in FIG. 2, the further drive device 4b and the module 5 shown in FIG. 1 are in the form of a common module 5' for reproducing the transmitter signal.

According to the embodiment shown in FIG. 2, the module 5' is thus directly coupled to the control device 1 by means of the data bus 7, whereas, in the exemplary embodiment shown in FIG. 1, the module 5 is coupled to the control device 1 via a further drive device 4b by means of the data bus 7.

The invention allows rapid continuous design of the machine, making it possible for the user to have a continuous technological view during design.

In this case, the design process is effected by determining the different configurations, for example for the position regulating device, the drive device and the motor and the transmitter, for each machine axle in a design tool. The software for the control device and the drive devices is then compiled using the design process which has been carried out.

Furthermore, it shall be noted at this juncture that the guide value need not necessarily be predefined by the guide value determination unit 2 but rather may also be generated by another component.

The invention provides a module for reproducing a transmitter signal, which makes it possible to design, start up and set the dynamics of the machine in a simple manner.

What is claimed is:

1. A control system for controlling a machine, comprising:
    a module for reproducing a transmitter signal;
    a drive device;
    a control device for controlling the machine, wherein the control device interprets a configuration of the module and a configuration of the drive device in an identical manner;
    a first position regulating device within the control device;
    a second position regulating device within the control device;
    a data bus connecting the drive device and the control device to transmit a first desired value from the first position regulating device to the drive device and to transmit a first actual value from the drive device to the first position regulating device, wherein the first desired value is based upon a guide value predefined by the control device;
    a transmitter coupled to the drive device and to the machine;
    a data bus connecting the module and the control device and configured to transmit a second desired value from the second position regulating device to the module, wherein the module determines a reproduced transmitter signal from the second desired value, which is based upon the guide value, wherein the determination is based upon a simulation of a control characteristic of a machine axle, and to transmit a second actual value, based upon the determined value, from the module to the second position regulating device; and
    a further control device connected to the module to receive a value based upon the second actual value.

2. The module of claim 1, wherein the module is directly coupled to the control device by the data bus.

3. The module of claim 1, wherein the module is coupled to the control device by the data bus via an additional drive device.

4. The module of claim 1, wherein the module is logically coupled as an actuator.

5. The module of claim 1, wherein the data bus is implemented as a Profibus.

6. The module of claim 1, wherein control device interprets the reproduced transmitter signal as being regulated and as having dynamical properties identical to those of a machine axle that is controlled by the control device.

7. The control system of claim 1, wherein the machine comprises a machine tool, a production machine or a robot.

* * * * *